United States Patent
Nomura et al.

(10) Patent No.: US 7,664,381 B2
(45) Date of Patent: *Feb. 16, 2010

(54) CONTROLLER, PHOTOGRAPHING EQUIPMENT, CONTROL METHOD OF PHOTOGRAPHING EQUIPMENT, AND CONTROL PROGRAM

(75) Inventors: Kazuo Nomura, Shiojiri (JP); Tatsuya Hosoda, Chino (JP)

(73) Assignee: Seiko Epson Corporation (JP)

( * ) Notice: Subject to any disclaimer, the term of this patent is extended or adjusted under 35 U.S.C. 154(b) by 398 days.

This patent is subject to a terminal disclaimer.

(21) Appl. No.: 11/564,008

(22) Filed: Nov. 28, 2006

(65) Prior Publication Data

US 2007/0122130 A1 May 31, 2007

(30) Foreign Application Priority Data

Nov. 29, 2005 (JP) ............................. 2005-343368
Oct. 20, 2006 (JP) ............................. 2006-285800

(51) Int. Cl.
*G03B 17/00* (2006.01)

(52) U.S. Cl. .................................... 396/55; 348/208.99

(58) Field of Classification Search ............. 396/52–55; 348/208.99, 208.1–208.5

See application file for complete search history.

(56) References Cited

U.S. PATENT DOCUMENTS

| 4,673,276 | A | * | 6/1987 | Yoshida et al. ................. 396/54 |
| 5,708,863 | A | * | 1/1998 | Satoh et al. ................... 396/52 |
| 6,600,876 | B2 | * | 7/2003 | Sato ............................. 396/55 |
| 6,778,210 | B1 | * | 8/2004 | Sugahara et al. ......... 348/208.4 |
| 7,557,832 | B2 | * | 7/2009 | Lindenstruth et al. .. 348/208.99 |

FOREIGN PATENT DOCUMENTS

| JP | 11-134481 | 5/1999 |
| JP | 2005-170460 | 6/2005 |
| JP | 2005-343368 | 12/2005 |
| JP | 2006-004542 | 1/2006 |

* cited by examiner

*Primary Examiner*—Melissa J Koval
*Assistant Examiner*—Autumn Parker
(74) *Attorney, Agent, or Firm*—Harness, Dickey & Pierce, P.L.C.

(57) ABSTRACT

A controller is provided which includes a photographing control unit controlling an image pickup unit to take a photograph and a shake detecting unit detecting an amount of shake even time the image pickup unit takes a photograph. Here, the photographing control unit allows the image pickup unit to consecutively take a photograph and ends the photographing operation of the image pickup unit when the amount of shake detected by the shake detecting unit at the time of the photographing operation of the image pickup unit is larger than the amount of shake detected at the time of the previous photographing operation.

4 Claims, 3 Drawing Sheets

CONTROLLER, PHOTOGRAPHING EQUIPMENT, CONTROL METHOD OF PHOTOGRAPHING EQUIPMENT, AND CONTROL PROGRAM

BACKGROUND

1. Technical Field

The present invention relates to a technology of suppressing an influence of a shake at the time of photographing.

2. Related Art

In the past, a technology of removing a disturbance of an image due to shake at the time of photographing by correcting a photographed image is known. For example, the disturbance of an image due to shake is removed by correcting a photographed image using trace data of shake (for example, see JP-A-11-134481).

However, since the process of correcting an image is complex and a work load thereof is great, a high processing capability is often required. Accordingly, it is difficult to simplify hardware performing the correcting process and to reduce the cost therefore. Therefore, it can be considered that the shake is suppressed without performing the correcting process, but a user's high-level ability is required for suppressing the shake itself at the time of photographing. Accordingly, it is not easy to obtain an image no having shake without performing the correcting process.

SUMMARY

An advantage of the invention is to easily provide a beautiful image not having shake without correcting a photographed image.

According to an aspect of the invention, there is provided a controller comprising: a photographing control unit controlling an image pickup unit to take a photograph; and a shake detecting unit detecting an amount of shake every time the image pickup unit takes a photograph. Here, the photographing control unit allows the image pickup unit to consecutively take a photograph and ends the photographing operation of the image pickup unit when the amount of shake detected by the shake detecting unit at the time of the photographing operation of the image pickup unit is larger than the amount of shake detected at the time of the previous photographing operation.

According to this configuration, when the amount of shake increases while the image pickup unit consecutively takes a photograph, the photographing operation is rapidly ended. Accordingly, the photographing operation is consecutively performed while the amount of shake every photographing operation decreases and the photographing operation is ended when the amount of shake increases. That is, the photographing operation is ended rapidly after the photographing operation is performed in the state where the amount of shake is the least. As a result, it is possible to easily and rapidly obtain a beautiful image having no shake.

The controller may further comprise an image storing unit storing an image taken by the image pickup unit, and the image storing unit may update a previously stored image to a latest taken image every time the image pickup unit takes a photograph. In this case, the latest image when the amount of shake decreases is stored in the image storing unit while the photographing operation is consecutively performed by the image pickup unit. Accordingly, since the photographed image with the least amount of shake is always stored in the image storing unit, it is possible to easily obtain a beautiful image having no shake after ending the photographing operation. Since the image storing unit always updates the photographed image stored therein to the latest photographed image, use efficiency of a memory storing the photographed images is high and thus the memory capacity thereof is not necessarily large.

In the above-mentioned controller, the image storing unit may not update a previously stored image when the photographing control unit ends the photographing operation. In this case, when the amount of shake increases during the consecutive photographing operation, the photographing operation is ended and the image right before the amount of shake increases is stored. Accordingly, since the photographed image when the amount of shake is the least is stored by the image storing unit, it is possible to easily obtain a beautiful image having no shake. It is possible to store photographed images by efficiently using a small memory capacity.

According to another aspect of the invention, there is provided a controller comprising: a photographing control unit controlling an image pickup unit to take a photograph; and a shake detecting unit detecting an amount of shake every time the image pickup unit takes a photograph. Here, the photographing control unit allows the image pickup unit to consecutively take a photograph and ends the photographing operation of the image pickup unit when the amount of shake detected by the shake detecting unit at the time of the photographing operation of the image pickup unit is smaller than an allowable amount of shake.

According to this configuration, when the amount of shake at the time of a consecutive photographing operation of the image pickup unit is smaller than the allowable amount of shake, the photographing operation is rapidly ended. Accordingly, it is possible to easily and rapidly obtain a beautiful image having no shake In the above-mentioned controller, the photographing control unit may determine the allowable amount of shake before allowing the image pickup unit to consecutively take a photograph. In this case, when the allowable amount of shake determined by a user before performing the consecutive photographing operation is smaller than the allowable amount of shake, the photographing operation is ended. Accordingly, it is possible to rapidly obtain a beautiful image having no shake by judging the amounts of shake in accordance with a predetermined reference.

In the above-mentioned controller, the photographing control unit may determine the allowable amount of shake on the basis of the amount of shake in a previous photographing operation while allowing the image pickup unit to consecutively take a photograph. In this case, since the allowable amount of shake can be changed while performing the consecutive photographing operation, it is possible to change the allowable amount of shake, for example, on the basis of the amounts of shake in the first several photographing operations. Accordingly, since the allowable amount of shake is automatically set to correspond to a photographing environment, it is possible to easily and rapidly obtain a beautiful image having no shake.

According to still another aspect of the invention, there is provided a photographing equipment comprising: an image pickup unit; a photographing control unit controlling the image pickup unit to take a photograph; and a shake detecting unit detecting an amount of shake every time the image pickup unit takes a photograph. Here, the photographing control unit allows the image pickup unit to consecutively take a photograph and ends the photographing operation of the image pickup unit on the basis of the amount of shake detected by the shake detecting unit every photographing operation.

According to still another aspect of the invention, there is provided a control method of a photographing equipment having an image pickup unit, comprising: detecting an amount of shake every time the image pickup unit takes a photograph, allowing the image pickup unit to consecutively take a photograph, and ending the photographing operation of the image pickup unit on the basis of the amount of shake detected every photographing operation.

According to still another aspect of the invention, there is provided a control program making a computer serve as: a shake detecting Unit detecting an amount of shake every time the image pickup unit takes a photograph; and a photographing control unit allowing the image pickup unit to consecutively take a photograph and ending the photographing operation of the image pickup unit on the basis of the amount of shake detected every photographing operation.

The invention can be embodied not only as applied to the controller, the photographing equipment, the control method of a photographing equipment, and the control program, but may be also put into practice such that the control program can be downloaded through a telecommunication network or can be stored and distributed in a computer-readable recording medium such as a magnetic recording medium, an optical recording medium, and a semiconductor recording medium.

In the controller, the photographing equipment, the control method of the photographing equipment, and the control program according to some aspects of the invention, since the consecutive photographing operation is ended on the basis of the amount of shake at the time of performing the photographing operation, it is possible to easily and rapidly obtain a beautiful image having no shake.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings. In the first embodiment, the invention is applied to a portable digital camera (hereinafter, simply referred to as "digital camera") as an example of an electronic apparatus.

Figure 1:
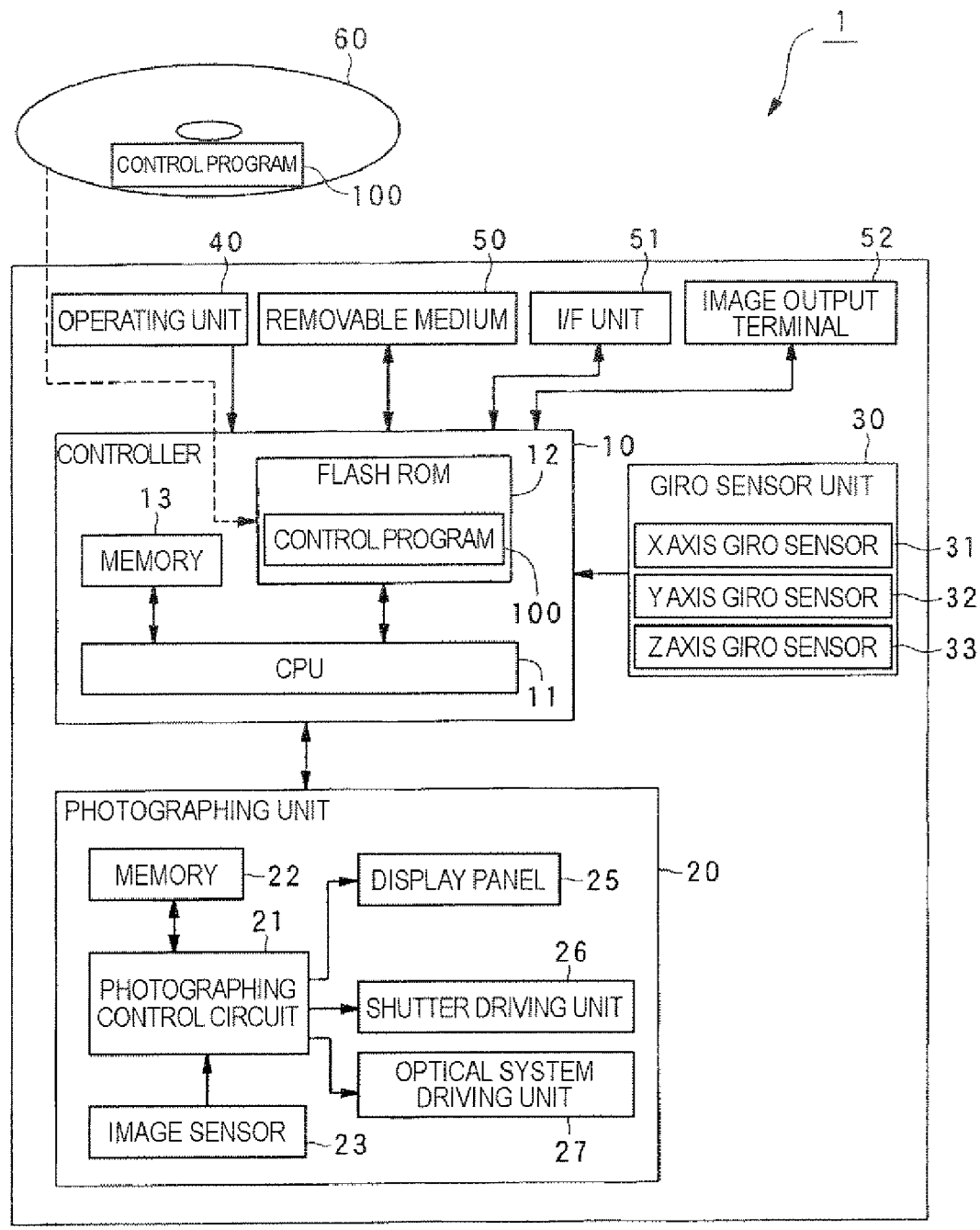
FIG. 1 is a block diagram illustrating a configuration of a digital camera according to a first embodiment of the invention.

FIG. 1 is a block diagram illustrating a configuration of a digital camera 1 as a photographing equipment according to a first embodiment. As shown in FIG. 1, the digital camera 1 includes a controller 10, a photographing unit 20, a gyro sensor unit 30, an operating unit 40, a removable medium 50, an I/F unit 51, and an image output terminal 52.

The controller 10 serves as a control unit controlling the respective units of the digital camera 1 and includes a central processing unit (CPU) 11 executing a variety of programs and performing operations, a rewritable flash read only memory (hereinafter, simply referred to as "ROM") 12 storing a control program 100 executed by the CPU 11 and a variety of data, a memory 13 serving as a work area temporarily storing operations results of the CPU 11 and a variety of data, and a timer circuit 14 counting time. The control program 100 stored in the ROM 12 includes a photographing control program performing a consecutive photographing operation of photographing an image without shake as described later.

The control program 100 can be recorded and distributed in a computer-readable recording medium 60 such as a CD-ROM, a DVD-ROM, and a floppy disc (registered trademark). In addition, the digital camera 1 may be communicatably connected to a personal computer through a cable, etc., the control program 100 of the recording medium 60 read out by the personal computer may be output to the digital camera 1, and then the control program 100 may be stored in the flash ROM 12.

The photographing unit 20 has a function of outputting image data of a photographed image obtained by photographing an object and includes a photographing control circuit 21, a memory 22, an image sensor 23, a display panel 25, a shutter driving unit 26, and an optical driving unit 27.

The photographing control circuit 21 serves to control elements of the photographing unit 20 under the control of the controller 10. The memory 22 temporarily stores a variety of information such as image data processed by the photographing control circuit 21.

The image sensor 23 is an image sensor in which photoelectric conversion elements such as charge coupled devices (CCD) and complementary metal oxide semiconductors (CMOS) are arranged in a two-dimensional matrix or in a honeycomb shape and includes an A/D conversion circuit (not shown) together. The image sensor 23 converts analog signals generated from the photoelectric conversion elements into digital data and sequentially outputs image data to the photographing control circuit 21 at a predetermined sampling rate.

The display panel 25 displays a variety of information such as the photographed image photographed by the image sensor 23 and a setting picture under the control of the photographing control circuit 21 and includes a flat display panel such as a liquid crystal display panel and an organic electroluminescence (EL) panel.

The shutter driving unit 26 drives a mechanical shutter (not shown) shielding the image sensor 23 from external light and exposes the image sensor 23 to light for a predetermined exposure time under the control of the photographing control circuit 21.

The optical driving unit 27 serves to drive a lens group (not shown) constituting an optical system along with the image sensor 23 and an iris mechanism (not shown) to adjust a zoom, a focus, and an iris.

The operating unit 40 includes a plurality of operating elements (not shown) such as a power supply switch turning on and off the digital camera 1 and a shutter switch instructing execution of a photographing operation, which are operated by a user, and generates an operation signal indicating the operating details at the time of operating the operating elements and outputs the generated operation signal to the controller 10. The operating unit 40 may detect the operation of a touch panel formed integrally with the display panel 25.

The removable medium 50 serves to store moving picture data photographed by the photographing unit 20 and includes a disc-type recording medium on which information can be optically or magnetically recorded and a card-type recording medium employing semiconductor memory elements, The I/F unit 51 is an interface having a connector and the like for connecting the digital camera 1 to an external apparatus (for example, a personal computer or a printer) of the digital camera 1 through a cable or the like. For example, when the image data stored in the removable medium 50 are output to the personal computer, the image data are output to the personal computer through the I/F unit 51.

The image output terminal 52 is a terminal for outputting moving picture signals to an external display apparatus such as a television and a projector. The digital camera 1 includes an audio circuit for receiving, recording, and reproducing voice signals and a voice output terminal for outputting the voice signals to an external speaker or an external amplifier, in addition to the above-mentioned constituent elements.

In the digital camera 1 having the above-mentioned configuration, when the shutter switch of the operating unit 40 is operated, an optical system is driven by the optical system driving unit 27 to adjust the zoom, the focus, and the iris and the mechanical shutter is driven by the shutter driving unit 26 to expose the image sensor 23 to light, As a result, image data are input to the photographing control circuit 21 from the image sensor 23. The photographing control circuit 21 acquires the image data input from the image sensor 23 and temporarily stores the acquired image data in the memory 22. The photographing control circuit 21 displays the photographed image on the display panel 25 on the basis of the image data stored in the memory 22.

The photographing control circuit 21 encodes the image data stored in the memory 22, converts the encoded image data into a predetermined data format such as JPEG (Joint photographic Experts Group), and outputs the converted image data to the controller 10. The controller 10 records the image data input from the photographing unit 20 on the removable medium 50.

Of course, the digital camera 1 may adjust the zoom, the focus, and the like by the use of the optical system driving unit 27 at the time point before the shutter switch of the operating unit 40 is operated.

The gyro sensor unit 30 of the digital camera 1 has a function of detecting the amount of shake during operation of the digital camera 1. Specifically, the gyro sensor unit 30 includes an X axis gyro sensor 31, a Y axis gyro sensor 32, and a Z axis gyro sensor 33.

The X axis gyro sensor 31 detects a rotation about an axis (hereinafter, referred to as X axis) set in the width direction of an image pickup surface of the image sensor 23. The Y axis gyro sensor 32 detects a rotation about an axis (hereinafter, referred to as Y axis) set in the height direction of the image pickup surface of the image sensor 23. The Z axis gyro sensor 33 detects a rotation about an axis (hereinafter, referred to as Z axis) set in the direction perpendicular to an image pickup surface of the image sensor 23. The gyro sensors 31, 32, and 33 output angular speed detection signals with voltage values corresponding to angular speeds to the controller 10 when they detect the rotations.

The controller 10 receives the angular speed detection signals of the gyro sensors 31, 32, and 33, calculates the amounts of shake about the X, Y, and Z axes, and stores the calculated amounts of shake in the memory 22 together with the image data as described later.

The calculation of the amount of shake will be briefly described. The controller 10 calculates an angular speed (rad/sec) on the basis of the angular speed detection signal and integrates the angular speed (rad/sec) with an exposure time (sec) at the time of photographing to calculate a movement angle θ (rad).

The controller 10 calculates the amount of shake in the number of pixels (dot) on the basis of the movement angle θ (rad) That is, when a focal length is L, an image angle is α, and the image angle α is still greater than the movement angle θ, Expression (1) is established between the amount of shake K (dot) and the movement angle θ:

$$\text{Amount of shake } k \text{ (dot)} = \text{movement angle } \theta \times \text{correction coefficient } r \quad (1)$$

where the correction coefficient r=focal length L×(1+tan²(α/2)).

The controller 10 calculates the amounts of shake with respect to the X, Y, and Z axis on the basis of Expression (1) every time the photographing unit 20 takes a photograph. Here, when the zoom power at the time of photographing is a value other than one time, the focal length L can be corrected in accordance with the value.

Due to individual difference between the gyro sensors 31, 32, and 33, the voltage value of the angular speed detection signal varies when the angular speed (rad/sec) is zero. Accordingly, in the first embodiment, the average value is set as a zero-point voltage value by sampling the angular speed detection signal of the gyro sensors 31, 32, and 33 after the main body is turned on and before the photographing operation is started. At this time, the controller 10 calculates a plurality of zero-point voltage values for a predetermined time and sets the average value of the zero-point voltage values as an actual zero-point voltage value when the zero-point voltage values of which a difference from the average value of the zero-point voltage value is smaller than a predetermined value is obtained greater than a predetermined ratio (for example, 99%) Accordingly, the zero-point voltage value can be set when the main body is in a stationary state.

The digital camera 1 having the above-mentioned configuration performs a consecutive photographing operation of taking a photograph several times. In the consecutive photographing operation, the digital camera 1 consecutively takes a photograph several times with the photographing unit 20, detects the amount of shake every time taking a photograph on the basis of the signals from the gyro sensor unit 30, and stores the image data and the detected amounts of shake in the memory 13. When the detected amount of shake is smaller than the predetermined allowable amount of shake, the digital camera stores the finally photographed image data in the memory 13 and ends the consecutive photographing operation. The allowable amount of shake is a threshold value which is sufficiently suitable for a photographed image since the affection of shake is not checked or the affection of shake is very small. Specifically, before performing the consecutive photographing operation, the CPU 11 determines the allowable amount of shake in response to the operation of the operating unit 40 and stores the allowable amount of shake in the memory 13. The consecutive photographing operation is not necessarily performed several times, and there is no problem even when only one photographing operation is performed as a result of ending the consecutive photographing operation on the basis of the detected amount of shake at the time of photographing.

In the consecutive photographing operation, the controller 10 serves as a controller, the CPU 11 serves as a photographing control unit, the memory 13 serves as an image storing unit, the photographing unit 20 serves as an image pickup unit, and the gyro sensor unit 30 serves as a shake detecting unit in cooperation with the CPU 11.

Now, the consecutive photographing operation will be described in detail.

Figure 2:
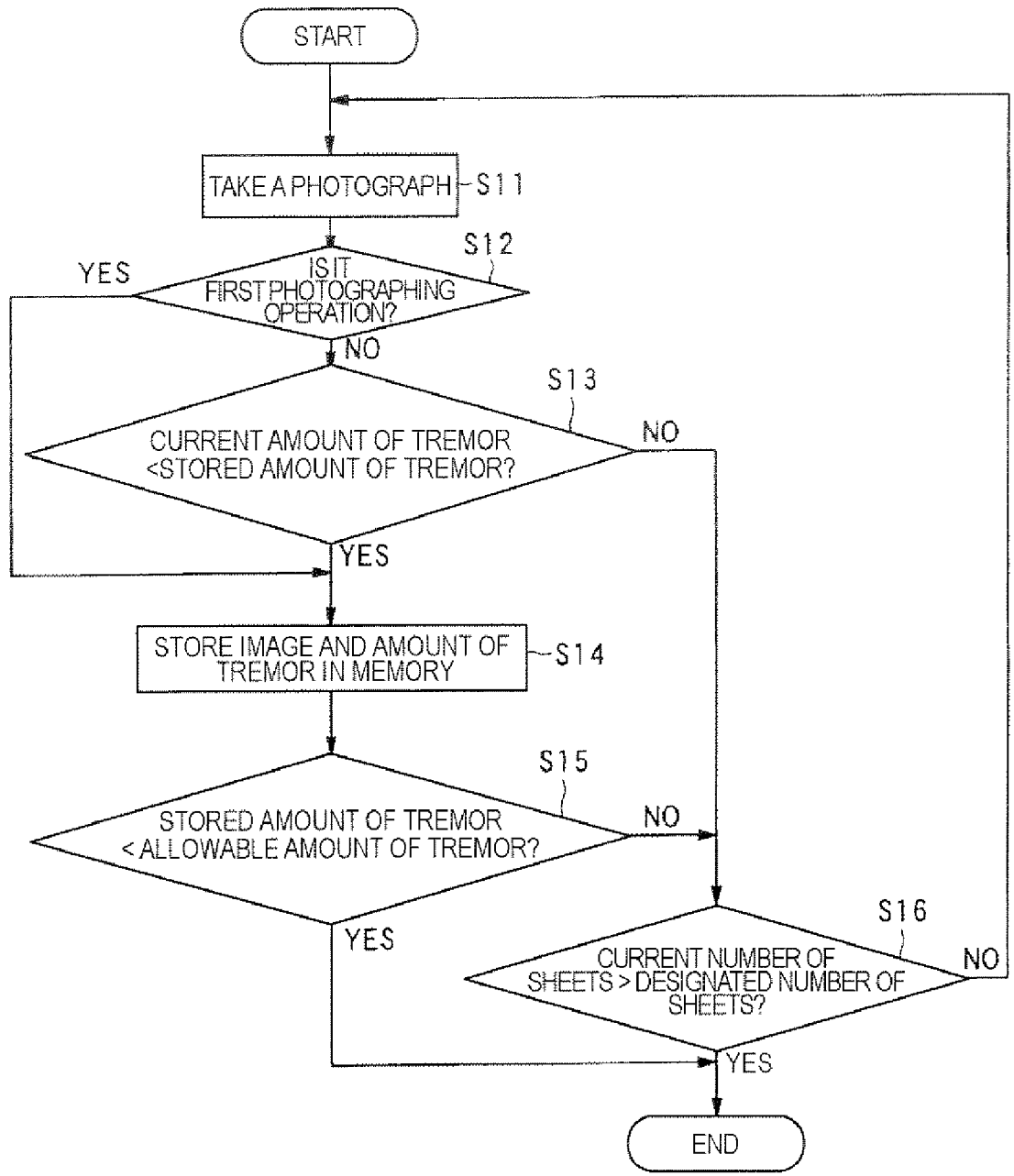
FIG. 2 is a flowchart illustrating a consecutive photographing operation of the digital camera.

FIG. 2 is a flowchart illustrating the consecutive photographing operation performed by the digital camera 1.

When the shutter switch of the operating unit 40 is operated and the consecutive photographing operation shown in FIG. 2 is started, the controller 10 controls the photographing control circuit 21 to perform a first photographing operation. That is, the photographing control circuit 21 controls the optical system driving unit 27 to adjust the focus and the zoom, calculates a proper exposure time corresponding to an external light quantity incident on the image sensor 23, drives the mechanical shutter with the shutter driving unit 26 in accordance with the exposure time to expose the image sensor 23 to the external light, and receives the image data output from the image sensor 23 (step S11). At the time of photographing, the controller 10 receives the angular speed detection signals input from the gyro sensors 31, 32, and 33 of the gyro sensor unit 30 and calculates the amounts of shake about the X, Y, and Z axes on the basis of the received angular detection signals.

Subsequently, the controller 10 judges whether the photographing operation in step S11 is the first photographing operation (step S12). When it is a second or later photographing operation (step S12: NO), the controller 10 compares the amount of shake of the current photographing operation performed in step S11 with the amount of shake stored in the memory 13 (step S13).

Here, when the amount of shake of the current photographing operation is smaller than the amount of shake stored in the memory 13 (step S13: YES), the controller 10 stores the photographed image data and the detected amount of shake of the current photographing operation in the memory 13 (step S14). When the photographing operation performed in step S11 is the first photographing operation (step S12: YES), the controller 10 stores the photographed image data and the amount of shake in the memory 13 to correlates them to each other in step S14.

When the previously photographed image data are stored in the memory 13, the controller 10 updates the image data stored in the memory 13 to the latest image data. Accordingly, the image data stored in the memory 13 is overwritten every time taking a photograph The controller 10 judges whether the amount of shake stored in the memory 13 is smaller than the predetermined allowable amount of shake (step S15). Here, when the amount of shake stored in the memory 13 is smaller than the allowable amount of shake (step S15: YES), the controller 10 ends the consecutive photographing operation. The controller 10 ends the consecutive photographing operation without performing a next photographing operation when the current photographing operation performed in step S11 is the first photographing operation but the amount of shake of the first photographing operation is smaller than the allowable amount of shake.

On the other hand, when the amount of shake of the current photographing operation performed in step S11 is equal to or greater than the amount of shake stored in the memory 13 (step S13: NO) and when the amount of shake stored in the memory 13 is greater than the allowable amount of shake (step S15: NO), the controller 10 compares the number of photographs taken up to now after the consecutive photographing operation is started with a predetermined number (step S16). Here, when the number of photographs is not greater than the predetermined number (step S16: NO), the controller 10 takes a photograph again in step S11 and when the number of photographs is greater than the predetermined number (step S16: YES), the controller 10 ends the consecutive photographing operation.

In this way, according to the first embodiment of the invention, in the consecutive photographing operation of consecutively taking a photograph with the photographing unit 20 under the control of the controller 10, the amount of shake is detected by the gyro sensor unit 30 every time taking a photograph and the consecutive photographing operation is ended and the subsequent photographing operation is not performed when the detected amount of shake is smaller than the allowable amount of shake. Accordingly, when no shake occurs at the time of taking a photograph or when the affection of shake is very small, the photographing operation is ended rapidly and it is thus possible to obtain a beautiful image for a short time.

The image data photographed by the photographing unit 20 are stored in the memory 13 along with the amount of shake and when the amount of shake of the current photographing operation is smaller than the amount of shake stored previously in the memory 13, the image data stored in the memory 13 are updated. Accordingly, since the image data of the photographing operation in which the amount of shake is the least are always stored in the memory 13, it is possible to easily obtain image data having no shake or very small shake by acquiring or outputting the image data stored in the memory 13. The number of image data stored in the memory 13 is constant regardless of the number of photographing operations at the time of the consecutive photographing operation and the capacity of the memory 13 may be small. Accordingly, it is possible to efficiently use the small capacity of memory.

In the first embodiment, it has been described that the allowable amount of shake is determined and stored in the memory 13 by the CPU 11 in response to the operation of the operating unit 40. The method of determining the allowable amount of shake will be described below with reference to a specific example.

First, before performing the consecutive photographing operation, the CPU 11 is changed to a setting mode of setting the allowable amount of shake by means of the operation of the operating unit 40. In the setting mode, the allowable amount of shake can be set in three steps of strong, middle, and weak and a user selects the allowable amount of shake by judging what amount of shake is allowable and operating the operating unit 40. Here, the CPU 11 detects the operation of the operating unit 40, determines a threshold value corresponding to the step selected from three steps of strong, middle, and weak as the allowable amount of shake, and stores the selected allowable amount of shake in the memory 13. In this example, the user can set the allowable amount of shake with a simple operation. In another example, an initial value (default value) of the allowable amount of shake is stored in advance in the memory 13. In this case, it is possible to perform an operation based on the allowable amount of shake without a user's setting operation.

In another example, the allowable amount of shake may be changed in the course of performing the consecutive photographing operation. In the consecutive photographing operation, the amount of shake is calculated every time taking a photograph and the amount of shake and the image data in step S14 are stored in the memory when the amount of shake is the least. Accordingly, the CPU 11 stores the amount of shake and the image data in the memory 13, then newly determines the allowable amount of shake on the basis of the stored amount of shake, and then stored the determined amount of shake in the memory 13. In order to newly determine the allowable amount of shake, a method of multiplying the amount of shake stored in the memory 13 in step S14 by a constant (for example, ½, ⅓, or the like) may be used. In this case, since the allowable amount of shake is determined on the basis of the least amount of shake after starting the consecutive photographing operation, there is an advantage that the allowable amount of shake suitable for the photographing environment is automatically determined. Accordingly, it is possible to avoid such a situation that the allowable amount of shake is too large and the consecutive photographing operation is ended right or that the allowable amount of shake is too small and thus the consecutive photographing operation is hardly ended, thereby efficiently taking a photograph.

In another example, the allowable amount of shake may be obtained by detecting the amounts of shake in the first and several photographing operations of the consecutive photographing operation and performing a calculating operation on the basis of the plural amounts of shake. In this case, the allowable amount of shake may be obtained by multiplying the average value of the amounts of shake by a constant. By performing the calculating operation on the basis of the plural amounts of shake every time taking a photograph, the allowable amount of shake may be obtained.

When the allowable amount of shake is determined in the course of performing the consecutive photographing operation, a method of determining the allowable amount of shake by the use of the above-mentioned method before starting the consecutive photographing operation and then changing the allowable amount of shake in the course of performing the consecutive photographing operation may be used, or a method of starting the consecutive photographing operation without determining the allowable amount of shake and then determining the allowable amount of shake in the course of performing the consecutive photographing operation may be used.

Second Embodiment

Figure 3:
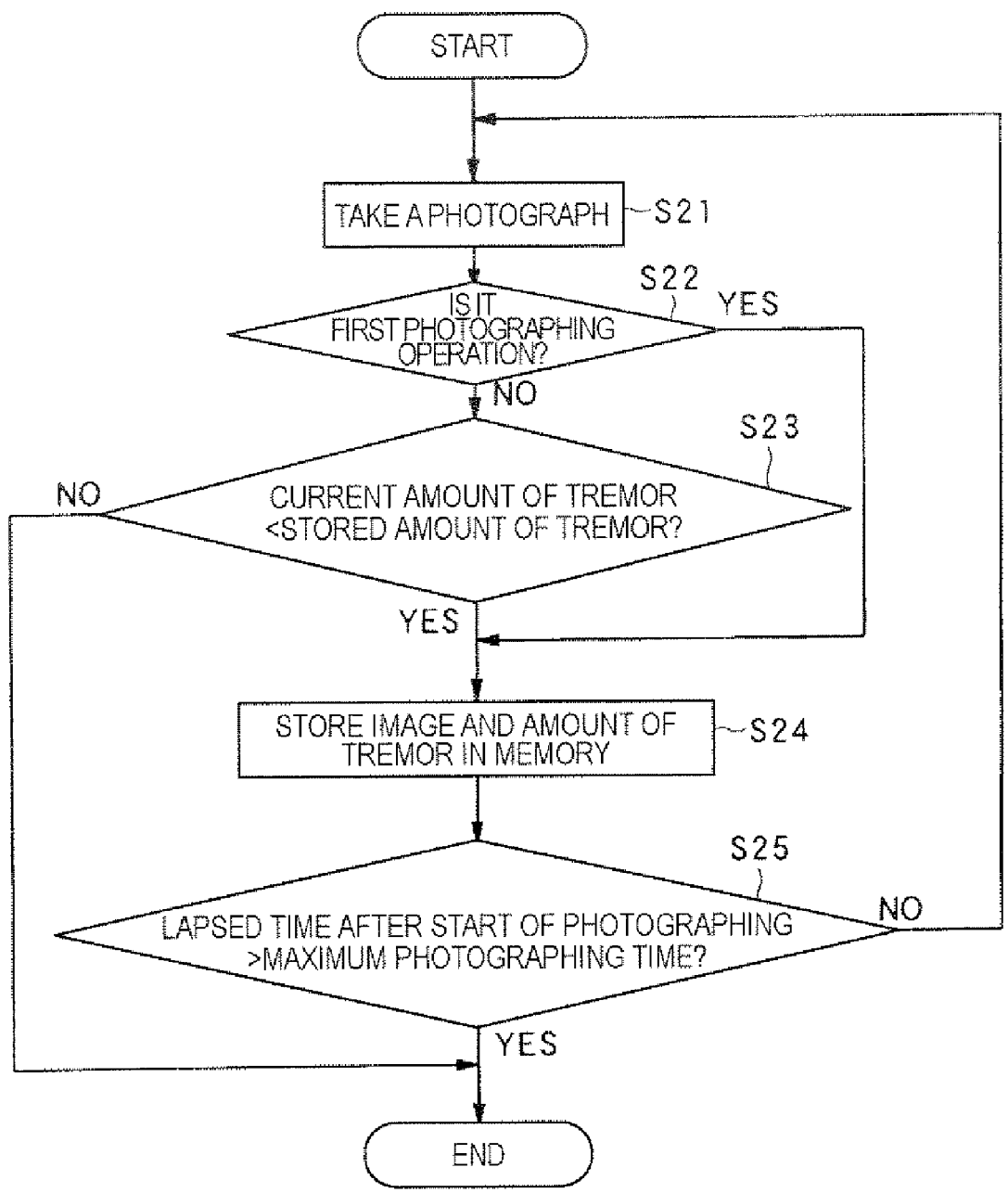
FIG. 3 is a flowchart illustrating a consecutive photographing operation of a digital camera according to a second embodiment of the invention.

FIG. 3 is a flowchart illustrating a consecutive photographing operation of a digital camera 1 according to a second embodiment of the invention.

In the second embodiment, since the digital camera 1 has the same configuration as the digital camera 1 according to the first embodiment, the constituent elements of the digital camera 1 are denoted by the same reference numerals and are not shown and described. The method of determining the allowable amount of shake is the same as the first embodiment.

The consecutive photographing operation shown in FIG. 3 is performed instead of the consecutive photographing operation (FIG. 2) in the first embodiment. In the consecutive photographing operation shown in FIG. 3, the digital camera 1 consecutively takes a photograph several times with the photographing unit 20, detects the amount of shake every time taking a photograph on the basis of the signals from the gyro sensor unit 30, and stores the image data and the detected amounts of shake in the memory 13. When the detected amount of shake is larger than a previous amount of shake stored in the memory 13, the digital camera ends the consecutive photographing operation without storing the image data of the current photographing operation. The consecutive photographing operation is not necessarily performed several times, and there is no problem even when only one photographing operation is performed as a result of ending the consecutive photographing operation on the basis of the detected amount of shake at the time of photographing.

In the consecutive photographing operation, the controller 10 serves as a controller, the CPU 11 serves as a photographing control unit, the memory 13 serves as an image storing unit, the photographing unit 20 serves as an image pickup unit, and the gyro sensor unit 30 serves as a shake detecting unit in cooperation with the CPU 11.

When the shutter switch of the operating unit 40 is operated and the consecutive photographing operation is started, the controller 10 controls the photographing control circuit 21 to perform a first photographing operation. That is, the photographing control circuit 21 controls the optical system driving unit 27 to adjust the focus and the zoom, calculates a proper exposure time corresponding to an external light quantity incident on the image sensor 23, drives the mechanical shutter with the shutter driving unit 26 in accordance with the exposure time to expose the image sensor 23 to the external light, and receives the image data output from the image sensor 23 (step S21). At the time of photographing, the controller 10 receives the angular speed detection signals input from the gyro sensors 31, 32, and 33 of the gyro sensor unit 30 and calculates the amounts of shake about the X, Y, and Z axes on the basis of the received angular speed detection signals.

Subsequently, the controller 10 judges whether the photographing operation in step S21 is the first photographing operation (step S22). When it is the photographing operation (step S22: YES), the controller 10 stores the image data photographed in step S22 and the amount of shake of the first photographing operation in the memory 13.

On the other hand, when it is a second or later photographing operation (step S22: NO) the controller 10 compares the amount of shake of the current photographing operation performed in step S21 with the amount of shake stored in the memory 13 (step S23.) When the amount of shake of the current photographing operation is smaller than the amount of shake stored in the memory 13 (S23: YES), the controller 10 stores the image data of the current photographing operation and the amount of shake of the current photographing operation in the memory 13 (step S24).

When the previously photographed image data are stored in the memory 13, the controller 10 updates the image data stored in the memory 13 to the latest image data. Accordingly, the image data stored in the memory 13 is overwritten every time taking a photograph.

The controller 10 compares the lapsed time after the photographing operation in step S21 is performed, that is, the time from the start of the consecutive photographing operation, with the predetermined maximum photographing time (step S25). When the time is smaller than the maximum photographing time, the photographing operation is performed again in step S21 and when the time is greater than the maximum photographing time, the consecutive photographing operation is ended.

When the amount of shake of the current photographing operation performed in step S21 is equal to or greater than the amount of shake stored in the memory 13 (step S23: NO), the controller 10 ends the consecutive photographing operation without performing the subsequent photographing operation. That is, the controller 10 continuously performs the photographing operation when the amount of shake of each photographing operation decreases gradually in the consecutive photographing operation and ends the consecutive photographing operation when the amount of shake increases.

According to the second embodiment, when the amount of shake in the consecutive photographing operation is greater than the amount of shake stored in the memory 13, that is, when the amount of shake increases, the controller ends the consecutive photographing operation. In general, it is known that the shake increases right after operating the shutter switch, then converges slowly, and increasing again after the convergence. Accordingly, in the consecutive photographing operation, the shake of the photographing operation increases right after the shake converges, in other words, that is, the shake is smallest right before the shake increases. Accordingly, the digital camera 1 stores the image data photographed in the first photographing operation along with the amount of shake in the memory 13 and updates the image data and the amount of shake stored in the memory 13 to the latest amount of shake and the latest image data only when the amount of shake is smaller than the amount of shake stored in the memory 13 in the second or subsequent photographing operation. Accordingly, the image data with the smallest amount of shake are stored in the memory 13 and thus it is possible to easily obtain beautiful image data with a small amount of shake. Since the photographing operation is not performed after the amount of shake is changed to increase in the consecutive photographing operation, it is possible to effectively reduce the time required for taking a photograph.

The above-mentioned embodiments show only an example of the invention and can be modified in various forms without departing from the scope of the invention.

That is, in the first and second embodiments, it has been described that the photographing control circuit 21 stores the image data input from the image sensor 23 in the memory 22 and displays the photographed image on the display panel 25 on the basis of the image data stored in the memory 22. However, at the time of performing the consecutive photographing operation, the image data stored in the memory 13 may be displayed on the display panel 25 after the consecutive photographing operation is ended.

In the first and second embodiments, the angular speed is detected by the gyro sensor unit 30 having the gyro sensors 31, 32, and 33 so as to detect the movement of the digital camera 1. The invention is not limited to it, but for example, an acceleration sensor may be used so long as it can detect the amount of movement per unit time of the digital camera 1. Although it has been described in the above-mentioned embodiments that the digital camera 1 includes the mechanical shutter driven with the shutter driving unit 26, the invention is not limited to the configuration, but any configuration may be employed so long as the photographing control circuit 21 can take out the signals corresponding to the exposure of the image sensor 23 for the exposure time. Accordingly, by always exposing the image sensor 23 and controlling the time for refreshing CCD or CMOS of the image sensor 23, the signals corresponding to the exposure time may be taken out, and other methods may be employed.

The invention can be applied to photographing equipment having a still image photographing function or a moving image photographing function, in addition to the digital camera 1 described in the first and second embodiments. Specific examples thereof can include a camera built-in mobile phone, a silver salt camera; and a PDA or a notebook computer which can be mounted internally or externally with a camera.

The entire disclosure of Japanese Patent Application Nos: 2005-343368, filed Nov. 29, 2005, 2006-285800, filed Oct. 20, 2006 are expressly incorporated by reference herein.

What is claimed is:

1. A controller comprising:
   a photographing control unit controlling an image pickup unit to take a photograph; and
   a shake detecting unit detecting an amount of shake every time the image pickup unit takes a photograph,
   wherein the photographing control unit allows the image pickup unit to consecutively take a photograph during a consecutive photographing operation and ends the consecutive photographing operation of the image pickup unit when the amount of shake detected by the shake detecting unit at the time of a current photographing operation of the image pickup unit is larger than the amount of shake detected at the time of a previous photographing operation of the consecutive photographing operation.

2. The controller according to claim 1, further comprising an image storing unit storing an image taken by the image pickup unit,
   wherein the image storing unit updates a previously stored image to a latest taken image every time the image pickup unit takes a photograph.

3. The controller according to claim 2, wherein the image storing unit does not update a previously stored image when the photographing control unit ends the consecutive photographing operation.

4. A photographing equipment comprising:
   an image pickup unit;
   a photographing control unit controlling the image pickup unit to take a photograph; and
   a shake detecting unit detecting an amount of shake every time the image pickup unit takes a photograph,
   wherein the photographing control unit allows the image pickup unit to consecutively take a photograph during a consecutive photographing operation and ends the consecutive photographing operation of the image pickup unit when the amount of shake detected by the shake detecting unit at the time of a current photographing operation of the image pickup unit is larger than the amount of shake detected at the time of a previous photographing operation of the consecutive photographing operation.

* * * * *